US008425970B2

(12) United States Patent
Anton et al.

(10) Patent No.: US 8,425,970 B2
(45) Date of Patent: *Apr. 23, 2013

(54) EDIBLE AERATED OIL-AND-WATER EMULSION

(75) Inventors: Marc Joaquin Antoine Anton, Nantes Cedex (FR); Valérie Anne Marie Beaumal, Nantes Cedex (FR); Jadwiga Malgorzata Bialek, Vlaardingen (GB); Donald Joseph Hamm, Englewood Cliffs, NJ (US); Helga Françoise Sirvente, Dijon (FR)

(73) Assignee: Conopco, Inc., Englewood Cliffs, NJ (US)

( * ) Notice: Subject to any disclaimer, the term of this patent is extended or adjusted under 35 U.S.C. 154(b) by 528 days.

This patent is subject to a terminal disclaimer.

(21) Appl. No.: 12/004,776

(22) Filed: Dec. 21, 2007

(65) Prior Publication Data

US 2008/0268131 A1 Oct. 30, 2008

(30) Foreign Application Priority Data

Dec. 28, 2006 (EP) .................................. 06292059

(51) Int. Cl.
*A23D 7/00* (2006.01)
(52) U.S. Cl.
USPC .......................................................... 426/605
(58) Field of Classification Search ................... 426/605
See application file for complete search history.

(56) References Cited

U.S. PATENT DOCUMENTS

| 2,585,925 | A |  | 2/1952 | Gallenkamp |  |
|---|---|---|---|---|---|
| 3,224,883 | A | * | 12/1965 | Pader et al. ................... | 426/116 |
| 3,728,133 | A |  | 4/1973 | Norris |  |
| 3,958,034 | A |  | 5/1976 | Nath et al. |  |
| 4,578,278 | A |  | 3/1986 | Giddey et al. |  |
| 6,010,734 | A | * | 1/2000 | Whelan et al. ................ | 426/565 |
| 2006/0105093 | A1 | * | 5/2006 | Bialek et al. ................... | 426/604 |

FOREIGN PATENT DOCUMENTS

| EP | 0 402 090 | 12/1990 |
| EP | 1 254 605 | 11/2002 |
| EP | 1 254 605 | 11/2006 |

OTHER PUBLICATIONS

Belitz, H.D. and W. Grosch, Ed."Food Chemistry"—Chapter 11.2—Structure, Physical Properties and Composition. 1999. 2nd Edition. Springer-Verlag Berlin Heidelberg Publisher. p. 519.*
Berchane, et al. "About mean diameter and size distributions of poly(lactide-co-glycolide) (PLG) microspheres." Journal of Microencapsulation, Aug. 2006, 23(5). 539-552.*
Mine. "Emulsifying characterization of hens egg yolk proteins in oil-in-water emulsions". Food Hydrocolloids. 12 (1998). pp. 409-415.*
*European Search Report*, EP 06 29 2059, dated May 16, 2007, 3 pp.
Sengupta, T., Razumovsky, L., and Damodaran, S.: "Energetics of protein-interface interactions and its effects on protein adsorption", Langmuir., vol. 15, 1999, pp. 6991-7001, XP002433937.
Castellani, O., Belhomme, C., David-Briand, E., Guerin-Dubiard, C., and Anton, M.: "Oil-in-water emulsion properties and interfacial characteristics of hen egg yolk phosvitin", Food Hydrocolloids., vol. 20, 2005, pp. 35-43, XP005020320.
Martinet, V., Saulnier, P., Beaumal, V., Couthaudon, J.-L., and Anton, M.: "Surface properties of hen egg yolk low-density lipoproteins spread at the air-water interface", Colloids and Surfaces. B, Biointerfaces, vol. 31, 2003, pp. 185-194, XP002433938.
Damodaran, S. and Xu, S.: "The role of electrostatic forces in anomalous adsorption behaviour of phosvitin at the air/water interface", Journal of Colloid and interface Science., vol. 178, 1996, pp. 426-435, XP002433939.
*International Search Report*, PCT/EP2007/063280, mailed 14 Apr. 2008, 4 pp.
Sengupta, T., Razumovsky, L, and Damodaran, S.: "Energetics of protein interface interactions;and its effects on protein adsorption", Langmuir., vol. 15, 1999, pp. 6991-7001, XP002433937.
Martinet V., Saulnier, P., Beaumal, V., Couthaudon, J.-L., and Anton, M.: "Surface properties of hen egg yolk low-density lipoproteins spread at the air-water Interface", Colloids and Surfaces. B, Biointerfaces, vol. 31, 2003, pp. 185-194, XP002433938.
Damodaran, S. and Xu, S.: "The role of electrostatic forces in anomalous adsorption behaviour of phosvitin at the air/water interface", Journal of Colloid and interface Science., vol. 178, 1996, pp. 426435, XP002433939.
Pursuant to MPEP §2001.6(b) applicants bring the following co-pending application to the Examiner's attention: Applicant: Anton, et al. Case No. F7946(V) U.S. Appl. No. 12/004,777, filed Dec. 21, 2007 For: Edibile Oil-and-Water Emulsion.
Aluko Rotimi E; Mine Yoshinori; "Competitive adsorption of hen's egg yolk granule lipoproteins'and phosvitin in oil-inwater emulsions", Journal of Agricultural and Food Chemistry, vol. 45, No. 12, Dec. 1997, pp. 4564-4570, XP002435699.
JP 2001 078712 A (Knorr Shokuhin KK), Mar. 27, 2001, XP002435702, abstract.
JP 10 201426 (Taiyo Kagaku KK), Aug. 4, 1998, XP002435703, abstract.

* cited by examiner

*Primary Examiner* — D. Lawrence Tarazano
*Assistant Examiner* — J. A. Watts
(74) *Attorney, Agent, or Firm* — Ellen Plotkin

(57) ABSTRACT

One aspect of the invention relates to an aerated water-continuous oil-and-water emulsion having an overrun in the range of 10-500%, said emulsion comprising:
    5-90 wt. % of an oil phase;
    10-95 wt. % of an aqueous phase;
    0.3-30% by weight of the aqueous phase of one or more egg yolk granule proteins selected from high density lipoprotein (HDL) and phosvitin; and
    from 0.05 up to 10% by weight of the aqueous phase of one or more egg yolk plasma proteins selected from low density lipoprotein (LDL) and livetin;
wherein the weight ratio of egg yolk granule proteins to egg yolk plasma proteins exceeds 1:1.
The aerated emulsions according to the present invention can easily be produced at a high overrun. Furthermore, the foam structure of these emulsions remains surprisingly stable during shelf life.

6 Claims, No Drawings

EDIBLE AERATED OIL-AND-WATER EMULSION

TECHNICAL FIELD OF THE INVENTION

The present invention relates to edible aerated oil-and-water emulsions. Examples of aerated oil-in-water emulsions encompassed by the present invention include aerated mayonnaise, aerated dressings, aerated sauces, whipped cream, soufflés, mousses and ice cream.

BACKGROUND OF THE INVENTION

Traditional mayonnaise is an oil-in-water type emulsion comprising vegetable oil (70-80%), egg yolk (5-8%), salt, vinegar (to achieve a pH of the water phase of less than 4.2 to be considered an acid stable food), mustard, and optionally sugar, pepper and herbs. The oil is generally present in mayonnaise as a dispersed phase with an average droplet size of 3-8 μm. Because of the droplet size and the high amount of dispersed phase, mayonnaise contains a very close packing of oil droplets. The close packing of oil droplets in combination with the very thin layer of aqueous phase separating said droplets results in a mayonnaise that exhibits a very desirable rheology that is perceived by consumers as a creamy thickness.

Mayonnaise typically has a specific density of about 0.9 g/cm$^3$. To keep the emulsion stable it is common practice in the field of mayonnaise to employ egg yolk as an emulsifying agent, although other emulsifiers, such lecithin, propylene glycol esters, alginates and vegetable gums have also been proposed.

There is an ever-increasing demand for mayonnaise-type products having a lower content of oil. However, the lowering of the oil content of a standard mayonnaise-type formulation will result in a less dense packing of the oil droplets within the continuous aqueous phase. As a result, the thickness or viscosity of the emulsion will decrease dramatically. Thus, a reduced fat mayonnaise of inferior quality is obtained, e.g. a mayonnaise that is not spoonable. In fact if the oil phase is reduced below the critical packing level (~65% w/w), a conventional mayonnaise will become pourable.

It has also been proposed in the prior art to reduce the oil content of mayonnaise by preparing an aerated mayonnaise product. U.S. Pat. No. 3,728,133, for instance, discloses mayonnaise foams comprising, as foaming agents, monoglycerides and hydroxy fatty acid ester of a glyceride.

U.S. Pat. No. 4,578,278 describes an aerated mayonnaise type foodstuff comprising a foam of micro bubbles of gas or air in an oil-in-water emulsion of oil, water, egg yolk, vinegar, seasoning, a gelifying stabilizer and coagulated whipped egg white. The gelifying agent is suitably selected from the group consisting of gelatine, pectin, alginates, carrageenan, agar, carob polysaccharides and starch.

An important disadvantage of the aforementioned foamed mayonnaise products resides in the fact that the advocated use of additives may not be allowed in products labelled as "mayonnaise" by national regulations. Furthermore, consumers increasingly object to the use of such additives to foodstuffs.

Hence, there is a need for aerated mayonnaise products that can easily be produced at a high overrun, whose foam structure remains stable during shelf life and which products are further characterised in that they do not contain any additives that are not conventionally used in mayonnaise.

SUMMARY OF THE INVENTION

The inventors have discovered that the aforementioned requirements can be met by stabilising aerated mayonnaise with egg yolk granule proteins. The inventors have further found that egg yolk granule proteins cannot only be used to stabilise aerated mayonnaise but that these proteins are actually capable of stabilising a variety of aerated water-continuous oil-and-water emulsions such as dressings, sauces, whipped cream, soufflés, mousses and ice cream.

Egg yolk contains a high level of fat and is itself an emulsion comprising a dispersion of oil droplets in a continuous aqueous phase. Hen's egg yolk has a total solid content of approximately 50 to 52% composed of 15.5 to 16.5% protein, 31.5 to 34.5% lipid, 0.5 to 1.5% carbohydrate and 0.9 to 1.2% ash. The egg-yolk lipids comprise as their main components approximately 65% triglyceride, 29% phospholipid and 5% cholesterol. Egg yolk protein consists of about 68% low-density lipoproteins (LDL), 16% high-density lipoproteins (HDL), 10% livetins and 4% phosvitins.

Egg yolk can be fractionated into a plasma and a granules fraction by diluting whole egg yolk with water or dilute aqueous saline solution followed by centrifugation to give a supernatant made up of plasma fraction (77-81wt. % of yolk dry matter) and the precipitate that contains the granule fraction (19-23 wt. % of yolk dry matter). The plasma fraction of hen's egg yolk contains about 25% proteins and about 73% lipids, both calculated by weight of dry matter. The protein component of the plasma fraction typically represents about 80 wt. % of the yolk proteins and contains low-density lipoprotein (±85 wt. %) and the water-soluble globular protein livetin (±15 wt. %). The granule fraction of hen's egg yolk typically contains about 64% protein and 31% lipids. The protein component of the granule fraction represents about 20 wt. % of the yolk and contains high density lipoprotein (±72 wt. %), phosvitin (±16 wt. %) and low density lipoprotein-g (±12 wt. %).

The inventors have discovered that despite the fact that whole egg yolk is not capable of effectively stabilising aerated oil-in-water emulsions, such as mayonnaise, the granule protein fraction that is contained within the egg yolk is an excellent stabiliser. Although the inventors do not wish to be bound by theory, it is believed that whereas the proteins contained in the granule fraction of egg yolk are capable of stabilising the foam structure within aerated oil-in-water emulsions, the proteins contained within the egg yolk plasma fraction actually have a destabilising effect on this same foam structure.

One of the advantages offered by the present invention is that it obviates or at least reduces the need to use stabilisers like modified starch and gums like xanthan, gellan or guar gum. The use of additives like artificial stabilisers in products labelled "mayonnaise" is not be allowed in some countries.

DETAILED DESCRIPTION OF THE INVENTION

Accordingly, one aspect of the invention relates to an aerated water-continuous oil-and-water emulsion having an overrun in the range of 10-500%, said emulsion comprising:
 5-90 wt. % of an oil phase;
 10-95 wt. % of an aqueous-phase;
 0.3-30% by weight of the aqueous phase of one or more egg yolk granule proteins selected from high density lipoprotein (HDL) and phosvitin; and
 from 0.05 up to 10 wt. % of the aqueous phase of one or more egg yolk plasma proteins selected from low density lipoprotein (LDL) and livetin;
wherein the weight ratio of egg yolk granule proteins to egg yolk plasma proteins exceeds 1:1.

The term "egg yolk" as used herein refers to the yolk obtained from bird eggs, most preferably hen's eggs.

The term "high density lipoprotein" (HDL) as used herein refers to a protein-lipid complex that is found in substantial concentrations in birds egg yolk. HDL comprises a protein with a hydrophobic pocket that holds the lipid component. HDL contains 75-80% apoproteins and 20-25% lipids. These lipids are composed of 65% phospholipids, 30% triglycerides and 5% cholesterol. Two sub-groups of HDL can be separated by ion chromatography: $\alpha$ and $\beta$-HDL. $\alpha$-HDL contains 6 time more sialic acid and 2 times more phosphorus than $\beta$-HDL. Consequently, $\alpha$-HDL is more acidic than $\beta$-HDL. Except for these differences, both types of HDL have similar chemical compositions. HDL has a molecular weight of approximately 400 kDa, a diameter of about 7-20 nm and a density of approximately 1.12 g/ml. Unlike LDL, HDL does not have a spherical structure, but its pseudo-molecular structure resembles that of globular proteins. Phospholipids contribute to stabilise the structure of HDL in water.

The term "low density lipoprotein" (LDL) has used herein refers to a globular complex that is a major component of birds egg yolk, said globular complex having a diameter of 17-60 nm and a density of about 0.982 g/ml. LDL comprises an inner core largely consisting of triglycerides and cholesteryl esters and a surface layer that mainly consists of phospholipids, cholesterol and apoproteins. The apoproteins represent 11-17 wt. % of LDL, the lipid components 83-89 wt. %. These lipids are composed of about 69% triglycerides, 26% phospholipids and 5% cholesterol. LDL is composed of 2 sub-groups: $LDL_1$ ($10.10^6$ Da) and $LDL_2$ ($3.10^6$ Da). $LDL_1$ represent 20% of total LDL and contains twice the amount of proteins as $LDL_2$. Chemical compositions of both types of LDL are similar. Proteins of LDL are composed of 6 apoproteins. The major apoprotein (130 kDa) accounts for more than 70% of the apoproteins. The second apoprotein represents about 20% of the apoproteins and its molecular weight is 15 kDa. Their isoelectric point is ranged from 6.5 to 7.3. Apoproteins of LDL contain about 40% of hydrophobic amino acids and present a random coil structure or a beta-sheet conformation. Consequently, they are highly hydrophobic and flexible molecules. Apoproteins of LDL are glycosylated on asparagyl residues and contain 1.3% of hexose, 0.67% of hexosamine and 0.38% of sialic acid.

The term "edible" as used herein means that the emulsion can be ingested and consumed in reasonable quantities without any toxic or other acute negative health effect. It will be understood therefore that the aerated emulsion of the present invention preferably does not contain any non-food grade additives.

The term "aerated" as used herein refers to the fact that the emulsion comprises a plurality of gas bubbles. These gas bubbles may consist of air, but also other gases can be used, e.g. $N_2$, $N_2O$ and $CO_2$. Thus, it will be understood that the term "aerated" is not to be construed as only referring to emulsions comprising entrapped air bubbles.

The overrun of the aerated emulsion is calculated as follows:

$$\% \text{ Overrun} = ((V_{aearated} - V_{non-aerated})/V_{non-aerated}) \times 100\%$$

wherein:
$V_{aearated}$ represents the volume of a given sample of an aerated emulsion at atmospheric pressure, excluding the volume occupied by particulate matter (e.g. fruit pieces or nuts)
$V_{non-aerated}$ represents the volume of the same sample after de-aeration, again at atmospheric pressure and again excluding the volume occupied by particulate matter The overrun of the present emulsion preferably is within the range of 30-400%, most preferably in the range of 50-300%.

As explained herein before, the invention resides in the recognition that the granule proteins contained within whole egg yolk are particularly effective in stabilising water-continuous water-and-oil emulsions. In whole hen's egg yolk the weight ratio of granular proteins (HDL and phosvitin) to plasma protein (LDL and livetin) is typically around 1:4. Thus, the present emulsions are characterised in that the egg yolk proteins employed contain substantially elevated levels of granular proteins. According to a particularly preferred embodiment, the weight ratio of the egg yolk granule proteins to the egg yolk plasma proteins within the emulsion exceeds 2:1, more preferably 4:1 and most preferably 9:1.

The benefits of the present invention are particularly pronounced in emulsions comprising from 30-90 wt. % of an oil phase and from 10-70 wt. % of an aqueous phase. Even more, preferably, the emulsion contains from 50-87 wt. % of an oil phase and from 13-50 wt. % of an aqueous phase. A typical representative of the latter type of emulsions is a reduced fat mayonnaise.

The oil phase contained in the present emulsion can suitably contain a variety of lipid ingredients such as triglycerides, diglycerides, monoglycerides, phospholipids and fat mimics such as sucrose polyesters. Preferably, triglycerides represent at least 80 wt. %, more preferably at least 90 wt. % and most preferably at least 95 wt. % of the oil phase. The oil phase components may be liquid at room temperature or they may be in crystalline form under ambient conditions. Preferably, at 20° C., the oil phase of the present invention contains less than 20 wt. %, more preferably less than 10 wt. % of solid fat. Most preferably, at the aforementioned temperature the oil phase contains no solid fat.

Preferred aerated emulsions include mayonnaise, dressings, savoury sauces, whipped cream, soufflés, mousses and ice cream. Especially preferred are mayonnaise, dressings and savoury sauces. Most preferably, the aerated emulsion is a mayonnaise. Here the term "mayonnaise" also encompasses products that strictly speaking are not a mayonnaise (e.g. because they do not meet the legal definition of a mayonnaise) but which exhibit the properties that are typical of mayonnaise, notably spoonability and in-mouth lubrication.

The aerated emulsions according to the present invention may comprise a dispersed or continuous oil phase. Preferably, the oil phase is a dispersed phase, in which case the present emulsion is an oil-in-water emulsion or a water-in-oil-in-water emulsion.

Typically, the present aerated emulsion comprises a dispersed oil phase having a mean diameter ($d_{3,2}$) in the range of 0.5-200 µm Even more preferably, the aerated emulsion comprises a dispersed oil phase having a mean diameter ($d_{3,2}$) in the range of 1-50 µm, most preferably in the range of 2-20 µm. The measurement of the particle size distribution is suitably performed using a laser diffraction based instrument (MASTERSIZER 2000). Samples are prepared by diluting 1 ml of sample with 9 ml of a 1% sodium dodecyl sulphate solution (SDS) (1:10) in order to deflocculate the oil droplets. Before measuring, the sample is agitated for approximately 30 seconds and left out for 1 h. The measurements are performed directly after processing. The value of the Sauter mean diameter $d_{3,2}$ is calculated as follows:

$$d_{3.2} = \frac{\sum n_i d_i^3}{\sum n_i d_i^2}.$$

Particularly good results have been achieved by the inventors by employing as egg yolk granule proteins an egg yolk granule fraction containing HDL and phosvitin in a weight ratio in excess of 1:1. Most preferably, the present emulsion contains HDL and phosvitin in a weight ratio within the range of 2:1 to 30:1.

Depending on the nature of the emulsion, the amount of egg yolk granule proteins needed to achieve sufficient stabilisation may vary widely. Preferably, the present emulsion contains 0.5-15%, most preferably 1-10% of egg yolk granule proteins by weight of the aqueous phase. As explained herein before, it is believed that egg yolk plasma proteins adversely affect the stabilising properties of the granule proteins. Consequently, according to a preferred embodiment the emulsion contains less than 3%, more preferably less than 1.0% and most preferably less than 0.5% of egg yolk plasma proteins by weight of the aqueous phase.

On the other hand, for obtaining optimal texture and firmness (in terms of Stevens value and mouth feel) of the emulsion of the invention, said emulsion contains at least 0.05%, preferably at least 0.1% by weight of the aqueous phase of one or more egg yolk plasma proteins selected from low density lipoprotein (LDL) and livetin.

The benefits of the present invention can be achieved within a wide pH-range, e.g. between pH 2.0 and 7.5. According to a particularly preferred embodiment, the aqueous phase of the emulsion has a pH of 2.0-7.0. Most preferably, the present emulsion is an acidic emulsion having a pH of 2.2-4.8, most preferably of 2.5-4.5. A low pH not only means that the emulsion tastes sour, but also helps to prevent microbial spoilage. According to a preferred embodiment, the present emulsion is free of preservatives (acidulants not being regarded as preservatives).

The stabilising effect of egg yolk granule proteins is particularly prominent in aerated emulsions whose aqueous phase contains not more than a limited amount of dissolved salts. Accordingly, in a preferred embodiment, the ionic strength of the aqueous phase of the present emulsion does not exceed the ionic strength of an aqueous solution of 5 wt. % NaCl, more preferably it does not exceed the ionic strength of a 2 wt. % NaCl aqueous solution.

An important advantage of the present invention lies in the fact that the stabilising effect of the egg yolk granule proteins is reflected in an increased firmness of the emulsion. The firmness of an emulsion can be assessed by determining the so called Stevens value. Typically, the present emulsion has a Stevens value in excess of 20 g, more preferably in excess of 40 g. Usually the Stevens value of the emulsion does not exceed 300 g. The Stevens hardness, expressed in grams, is determined at 20° C. using a typical mayonnaise grid in a Stevens LFRA Texture Analyzer (ex. Stevens Advanced Weighing Systems, UK) with a maximum load/measuring range of 1000 grams and by applying a penetration test of 20 mm at 1 mm/s penetration rate. The mayonnaise grid comprises square openings of appr. 3×3 mm, is made up of wire with a thickness of app. 1 mm and has the following shape:

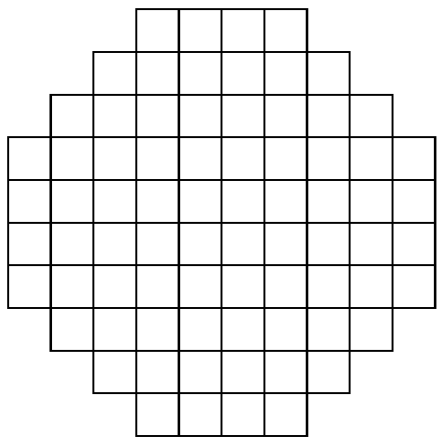 [SMILES: C1C2C3C4CC56CC78CC9%10CC%11C%12C%13CC%14%15CC%16%17CC%18%19CC%20C%21C%22CC%23%24CC%25%26CC%27%28CC%29C%30C%31CC%32%33CC%34%35CC1%36C21C32C45C34C67C56C98C78C%11%10C%129C%13%14C%10%11C%15%16C%12%13C%18%17C%14%15C%20%19C%21%16C%22%23C%17%18C%24%25C%19%20C%27%26C%21%22C%29%28C%30%23C%31%32C%24%25C%33%34C%26%27C%36%35C1%28C23C12C%28%26C3%26C%24%27C%24(C%23%25%21)C%22%19C%19%21C%17%20C%17(C%16%18%14)C%15%12C%12%14C%10%13C%10(C97%11)C85C5(C461)C23C(C%24%26%19)(C%105%12)C%17%21%14]

The aerated emulsion of the present invention, besides oil, water and egg yolk protein may suitably contain a variety of ingredients, such as food acids, flavouring materials and colourings. The emulsion may also contain other food additives such as EDTA. Examples of flavouring materials that may advantageously be incorporated in the present emulsion include sucrose, mustard, herbs, spices, lemon and mixtures thereof. According to a particularly preferred embodiment, the emulsion contains at least one of sucrose and mustard.

According to a particularly preferred embodiment the present emulsion has been acidified with one or more food acids selected from the group consisting of acetic acid, lactic acid malic acid and citric acid. Most preferably, the emulsion has been acidified with acetic acid and/or citric acid.

The aerated emulsion according to the invention is preferably substantially free of artificial stabilisers selected from gums, modified and unmodified starches. Gums include gellan, xanthan, galactomannan (e.g. guar gum and locust bean gum), alginate, carrageenan, konjac mannan, microcrystalline cellulose, gelatin, agar, gum arabic, curdlan, chitosan and mixtures thereof. Substantially free in this respect means less than 1 wt. %, preferably less than 0.5 wt. %, more preferably less than 0.1 wt. % and most preferably less than 0.01 wt %.

Another aspect of the invention relates to a process for the manufacture of an emulsion as defined herein before in which water, oil and egg yolk granule proteins are combined and homogenised, followed by acidification and optionally another homogenisations step. More particularly, this aspect of the invention relates to such a process comprising the successive steps of:

combining water, oil, egg yolk granule proteins and optionally other food ingredients;

homogenising the combined ingredients to obtain a water-continuous oil-and-water emulsion, preferably an oil-in-water emulsion; and aerating the emulsion to achieve the indicated overrun.

In order to homogenise the emulsion any suitably apparatus known to the person skilled in the art may be used. Preferred means include colloid mills (e.g. ex Ross), high pressure homogenisers and inline homogenisers (e.g. ex. Maelstrom IPM).

There are several processing routes by which aeration of the emulsion may be accomplished. Most common examples include the use of beating or whipping or whisking using conventional hand operated or electric food mixers or processors. The use of a whisking attachment allows entrainment of air into the food product. The rate of foaming and volume incorporated is in part dependent on the energy applied to the whisking of the product.

Additional routes of aeration include the use of pressurised aerosol systems containing soluble gases, such as carbon dioxide or nitrous oxide, which on operation release the gas under pressure to form a foam. Insoluble gases, such as nitrogen may also be used to form foams when incorporated into pressurised containers (e.g. the use of so-called "widget" technology in the brewing industry). Further additional processes of aeration include the use of ultrasound, which may also be used to create foam structures through a process of cavitation. Also, foams may also be produced through chemical reaction in which gases, such as carbon dioxide, are formed as a by-product of the reaction.

The present emulsion may suitably be subjected to a heat treatment to increase the shelf life. Any heat treatment known in the art may be used such as pasteurization, sterilisation, ultra high pressure and combinations thereof.

The invention is further illustrated by the following invention.

EXAMPLES

Example 1

Three aerated emulsions were produced on the basis of the following recipes:

| Ingredient (wt %) | A | B | C |
|---|---|---|---|
| Undenatured egg yolk protein[#] | 1.2 | — | — |
| Egg yolk granules protein[#] | — | 1.2 | — |
| Egg yolk plasma protein[#] | — | — | 1.2 |
| Oil | 60 | 60 | 60 |
| Aqueous NaCl solution (0.75M) | reminder | remainder | Remainder |
| Total | 100 | 100 | 100 |

[#]Concentrations indicated relate to yolk protein

The egg yolk granules and egg yolk plasma were isolated from the same undenatured hen's egg yolk that was employed in the preparation of one of the mayonnaise products. The egg yolk was obtained by the following procedure:

Break the fresh eggs
Roll the egg yolk on a tissue until all of the egg white is removed
Puncture the egg yolk membrane with a glass pipette in order to release the egg yolk from the "envelope"
Collect the released egg yolk in a beaker.

The plasma and granules fraction were isolated from the whole yolk so obtained by diluting the yolk with an equal amount of aqueous NaCl solution (0.17 M NaCl), followed by mild stirring for 1 hour. Next, the egg yolk suspension is centrifuged at 8,000 g and 10° C. for 30 minutes. After careful decanting of the supernatant, the supernatant is centrifuged again under the same conditions. The sediments so obtained are combined and washed 4 times (1 hour under stirring) with the NaCl solution, each washing step being followed by centrifugation under the aforementioned conditions. The combined sediments obtained after centrifugation represent the granules fraction and the combined supernatants the plasma fraction.

The emulsions were prepared by mixing the egg yolk components with water, adding the oil and mixing for 2 minutes with a rotor-stator at 20,000 rpm, followed by homogenisation at 100 bars. In order to obtain a similar oil droplet-size distribution, different homogenisation times were used for the three emulsions (from 9-15 minutes).

The emulsions were stored over night at 8° C. and subsequently aerated at the same temperature for 10 minutes in a Kenwood beat mixer. The products so obtained were analysed and evaluated by an expert panel shortly after preparation as well as after 21 days of storage at 5° C. The following results were obtained:

| | A | B | C |
|---|---|---|---|
| Freshly prepared | | | |
| Overrun | 103% | 59% | 137% |
| Viscosity (at 50 s$^{-1}$) | 0.8 Pa·s | 1.1 Pa·s | 0.3 Pa·s |
| Sensory properties | Yellowish, glossy, rough, wet Flowing | Dull, rough, wet Compact, solid, slight | Glossy, smooth, wet Liquid |
| After 21 days | | | |
| Stability | Unstable | Very stable | Unstable, collapsed |

Example 2

Example 1 was repeated except that this time the pH of the aqueous phase had been reduced to pH 4.0 through the addition of an aqueous acetic acid/sodium acetate buffer solution (50 mM). The emulsions were homogenised and aerated using similar homogenisation conditions as in Example 1.

This time the following results were obtained:

| | A | B | C |
|---|---|---|---|
| Freshly prepared | | | |
| Overrun | 60% | 59% | 103% |
| Viscosity (at 50 s$^{-1}$) | 0.9 Pa·s | 1.0 Pa·s | 0.5 Pa·s |
| Sensory properties | Coarse foam, very low viscosity | Strong foam | Very pourable, weak foam |
| After 21 days | | | |
| Stability | Unstable foam | Stable foam | Unstable foam |

The invention claimed is:

1. An aerated water-continuous oil-and-water emulsion having an overrun in the range of 10-500%, said emulsion comprising:
    50-87 wt. % of an oil phase;
    13-50 wt. % of an aqueous phase;
    0.5-15% % by weight of the aqueous phase of hen's egg yolk granule proteins selected from the group consisting of high density lipoprotein (HDL), phosvitin, and mixtures thereof; wherein said high density lipoprotein (HDL) and said phosvitin are present in a weight ratio in excess of about 1:1; and from 0.05% up to 3% by weight of the aqueous phase of hen's egg yolk plasma proteins selected from the group consisting of low density lipoprotein (LDL), livetin, and combinations thereof;

wherein the weight ratio of the egg yolk granule proteins to egg yolk plasma proteins exceeds 1:1;

wherein the emulsion has been acidified by one or more food acids selected from the group consisting of acetic acid, lactic acid, malic acid and mixtures thereof;

wherein the emulsion has a pH in the range of about 2.0 to about 7.0;

wherein the emulsion has a Stevens value in excess of 40 g; and wherein the emulsion is an oil-in-water emulsion containing oil droplets with a mean diameter ($d_{3,2}$) in the range of 0.5-200 µm.

2. The emulsion according to claim 1, wherein the ionic strength of the aqueous phase does not exceed the ionic strength of an aqueous 5 wt, % NaCl solution.

3. The emulsion according to claim 1, wherein the emulsion does not contain any non-food grade additives.

4. A process for the manufacture of an emulsion according to claim 1, said process comprising the successive steps of:

combining water, oil, egg yolk granule proteins and optionally other food ingredients; wherein said egg yolk granule proteins have high density lipoprotein (HDL) and phosvitin in a weight ratio in excess of about 1:1;

homogenising the combined ingredients to obtain a water-continuous oil-and-water emulsion; wherein said homogenising is achieved using a colloid mill, a high pressure homogenizer or an in-line homogenizer; and aerating the emulsion to achieve the indicated overrun.

5. The emulsion according to claim 1, wherein the weight ratio of the egg yolk granule proteins to the egg yolk plasma proteins exceeds 2:1.

6. The emulsion according to claim 1, wherein the aerated oil in-water emulsion is mayonnaise.

* * * * *